United States Patent

[11] 3,579,051

[72] Inventor Robert M. Olsen
Barrington, Ill.
[21] Appl. No. 868,504
[22] Filed Oct. 22, 1969
[45] Patented May 18, 1971
[73] Assignee Vapor Corporation
Chicago, Ill.

[54] SENSITIVE MAGNETIC AMPLIFIER RELAY DRIVER
10 Claims, 6 Drawing Figs.

[52] U.S. Cl. .......... 317/148, 317/148.5, 330/8
[51] Int. Cl. .......... H01h 47/34
[50] Field of Search .......... 317/148, 31, 148.6; 330/8; 307/314; 328/39.5 (Cursory)

[56] References Cited
UNITED STATES PATENTS

| | | | |
|---|---|---|---|
| 2,987,653 | 6/1961 | Prapis .......... | 317/148 |
| 3,214,672 | 10/1965 | Watkins .......... | 321/16 |
| 3,219,906 | 11/1965 | Keller et al. .......... | 321/16 |
| 3,309,583 | 3/1967 | Knapp-Ziller et al. .......... | 317/31X |
| 3,392,323 | 7/1968 | Darling .......... | 330/8X |

*Primary Examiner*—Milton O. Hirshfield
*Assistant Examiner*—Ulysses Weldon
*Attorney*—Norman Aon Witt

ABSTRACT: Electronic circuit capable of responding to a low signal input including a preamp magnetic amplifier circuit receiving one or a plurality of input signals and conditioned to deliver an output signal upon overcoming a reference signal, a second magnetic amplifier circuit for receiving the output signal of the preamp and conditioned to operate as a switch or as a bistable circuit and thereafter trigger a transistor for operating a relay.

INVENTOR
ROBERT M. OLSEN
BY
ATTORNEY

Patented May 18, 1971 3,579,051

4 Sheets-Sheet 2

INVENTOR
ROBERT M. OLSEN
BY [signature]
ATTORNEY

INVENTOR
ROBERT M. OLSEN
BY [signature]
ATTORNEY

INVENTOR
ROBERT M. OLSEN
BY [signature]
ATTORNEY

SENSITIVE MAGNETIC AMPLIFIER RELAY DRIVER

This invention relates in general to a relay driver responding to a low input signal, and more particularly to a magnetic amplifier relay driver capable of having high sensitivity and accuracy.

One of the problems heretofore incurred with relay drivers responding to small signal inputs is that the sensitivity and accuracy is not satisfactory over all environmental conditions. Moreover, it has been difficult to drive a relay through multiple signal inputs.

The present invention overcomes the above-mentioned difficulties by using well-known magnetic amplifier circuits, inasmuch as a signal output of a magnetic amplifier when changing polarity experiences practically no drift since at the polarity change point there is zero voltage output and zero signal input. It is also well known that where other than a zero signal input condition exists in a magnetic amplifier signal, drift will occur due to variation of temperature or supply of voltage from the power supply. Accordingly, the present invention makes use of this characteristic of a magnetic amplifier by triggering a bistable magnetic amplifier circuit with a magnetic amplifier at a zero signal input point when polarity is changing. The invention therefore provides a high sensitivity and accurateness in a relay driver responding to a low or small signal input.

The well-known characteristics of a magnetic amplifier are otherwise utilized in the present invention where a plurality of signal windings in the amplifier are capable of receiving a plurality of input signals that are electrically insulated from each other, and which are added arithmetically by the control windings.

The relay driver of the invention is especially useful in locomotives, although it may have other uses. For example, it may be employed in a transition relay circuit used on a locomotive for handling traction motors during speed changes, or it may be employed in a wheel overspeed and wheel slip recalibrate circuit on a locomotive for determining wheel conditions during driving of the locomotive.

It is therefore an object of the present invention to provide a new and improved relay driver having a high degree of sensitivity and accurateness, and which utilizes the well-known characteristics of magnetic amplifiers.

Another object of this invention is in the provision of a magnetic amplifier relay driver capable of responding to small signal inputs and capable of receiving a plurality of electrically insulated input signals.

Another object of this invention is in the provision of a magnetic amplifier relay driver capable of being sensitive and accurate over a wide range of environmental conditions and responsive to a plurality of signal inputs that are added arithmetically.

Other objects, features and advantages of the invention will be apparent from the following detailed disclosure, taken in conjunction with the accompanying sheets of drawings, wherein like reference numerals refer to like parts, in which.

Figure 5:
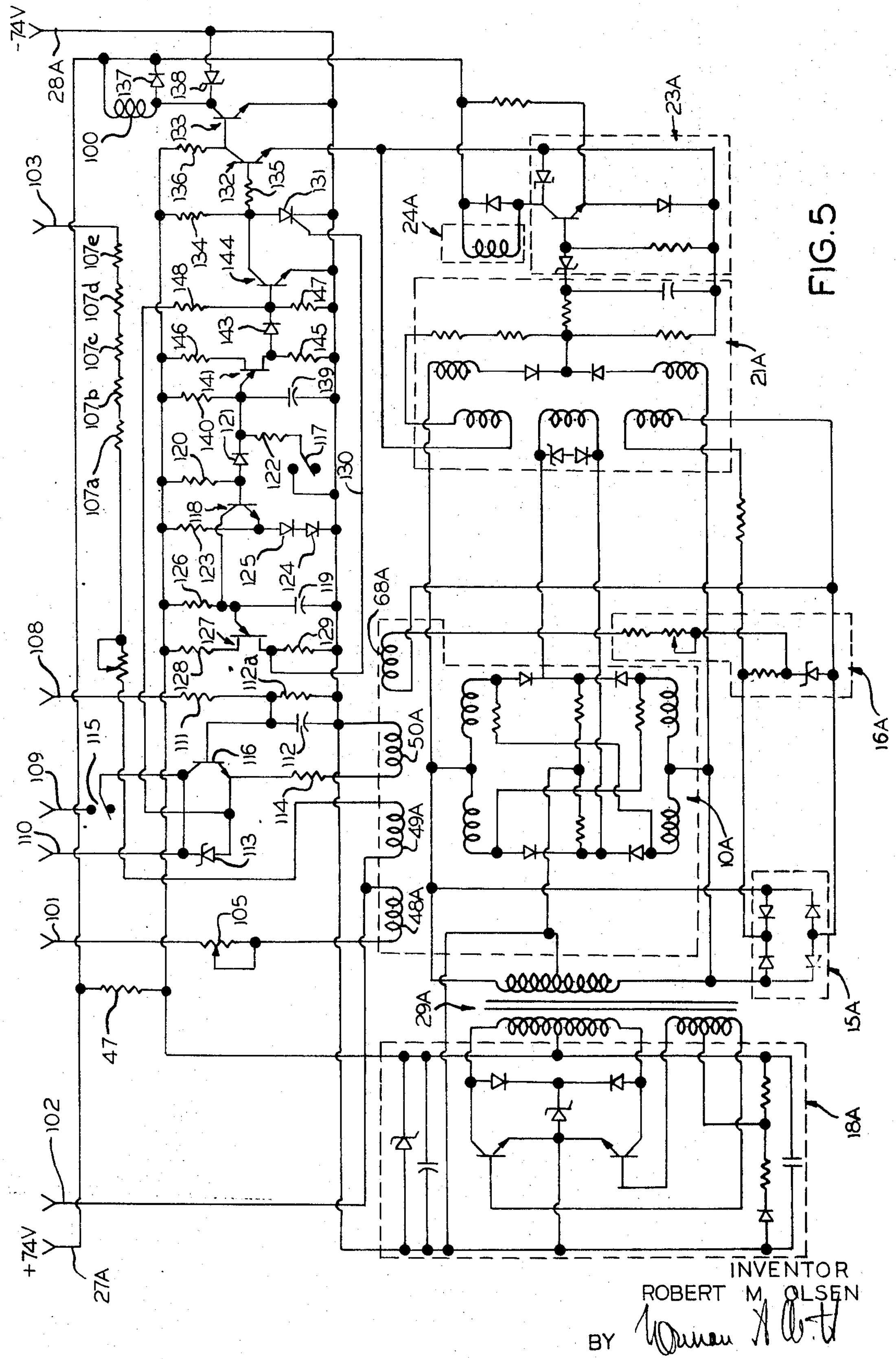
Figure 6:
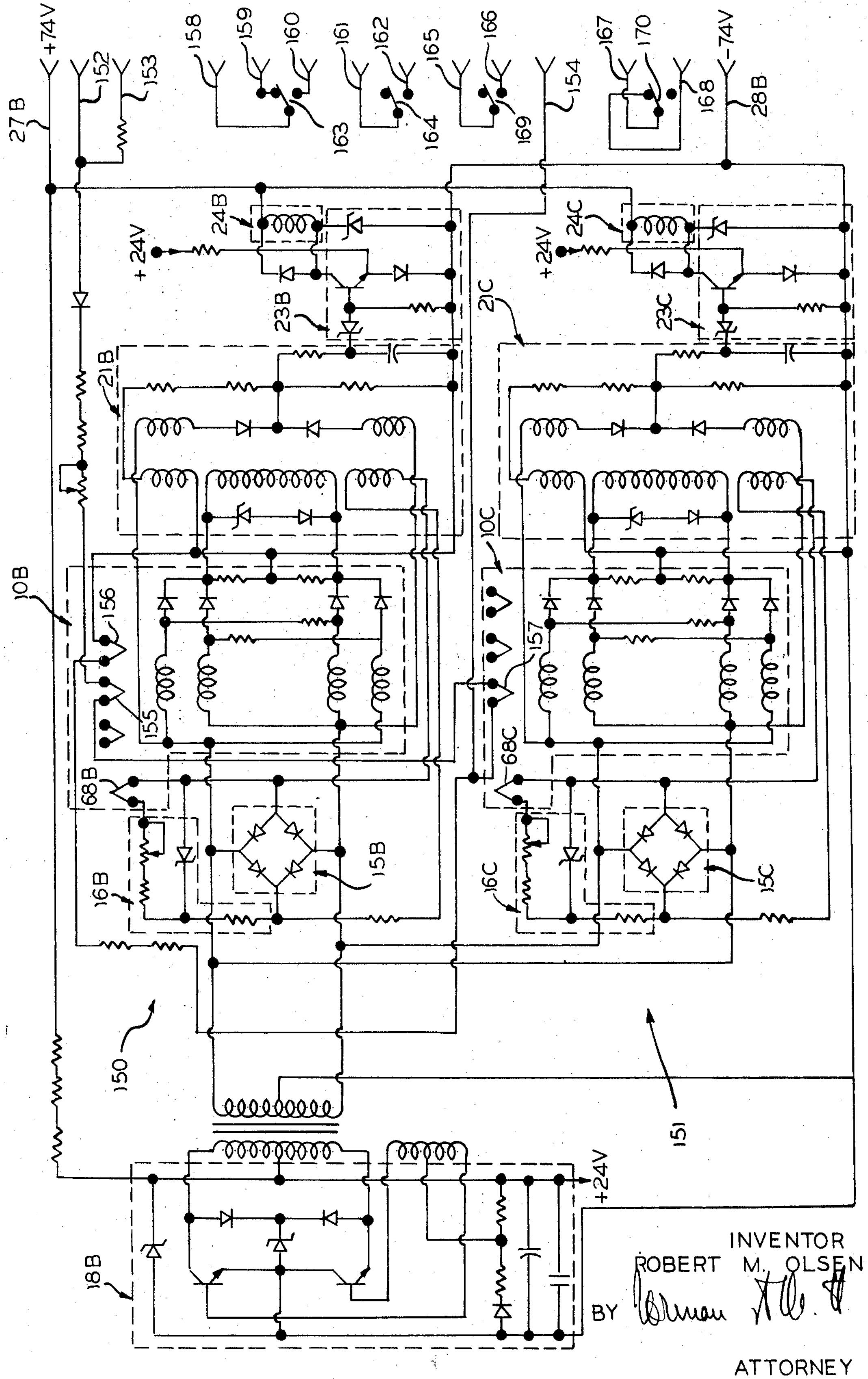

FIG. 5 is an electrical schematic diagram of a transition relay circuit employing the relay driver according to the present invention and utilized on a locomotive for handling traction motors during speed changes; and FIG. 6 is an electrical schematic diagram of a wheel overspeed and wheel slip recalibrate circuit employing a plurality of relay drivers according to the present invention and useful on a locomotive for determining wheel conditions during driving of the locomotive.

Figure 1:
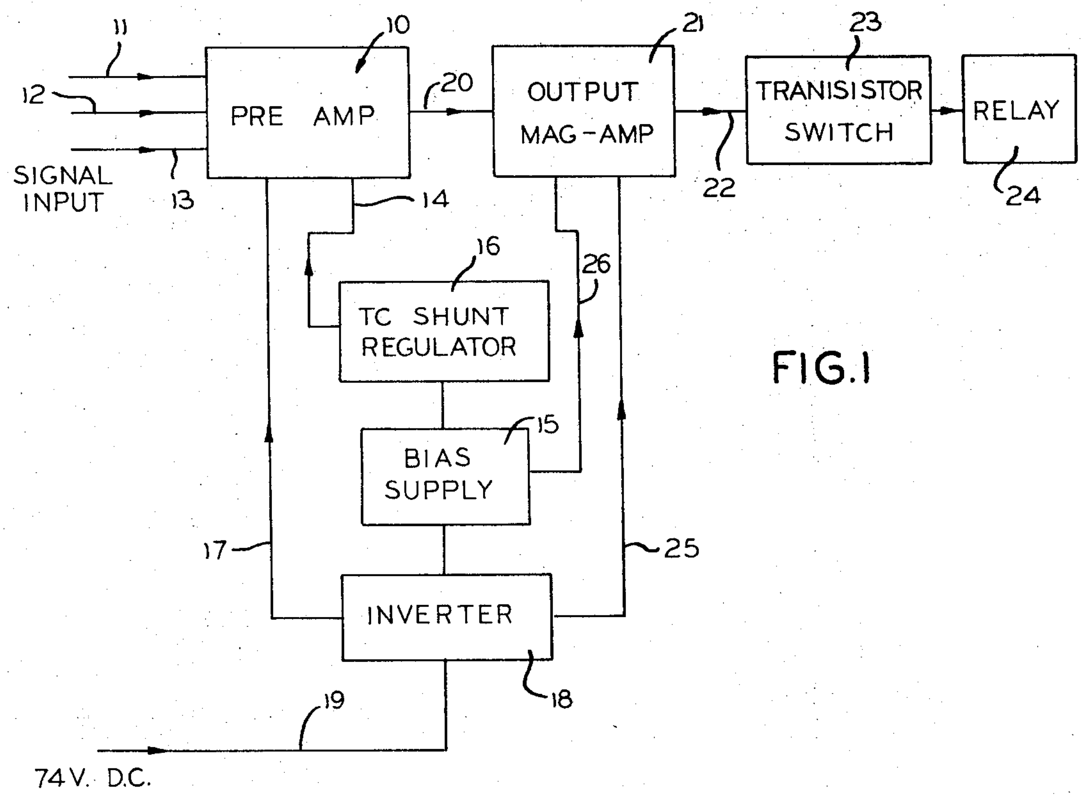
FIG. 1 is a block diagram of the relay driver according to the invention.

Referring now to the drawings and particularly to FIG. 1, the relay driver according to the present invention includes generally a preamp or input magnetic amplifier 10 receiving a plurality of input signals 11, 12 and 13, together with a bias signal 14 generated from a bias supply 15 that is regulated by a temperature-compensated shunt regulator 16. The resultant of the input signals 11, 12 and 13 is amplified. The preamp 10 is driven by an alternating current supply voltage 17 received from an inverter 18 that is powered by a DC supply 19. Inasmuch as the present invention is primarily intended for and has been satisfactorily employed in locomotive controls, the circuits illustrated are designed to operate from the 74-volt DC train supply. The output signal 20 of the preamp 10 is delivered to an output magnetic amplifier 21 that operates as a bistable amplifier or circuit to in turn deliver an amplified signal 22 to a transistor switch 23 which operates a relay 24. Triggering of the output magnetic amplifier 21 causes triggering of the transistor switch 23 and energization of the relay 24, the latter of which is employed to perform work in a circuit. The output magnetic amplifier 21 is also powered by an AC supply voltage 25 received from the inverter 18, and conditioned by a bias supply voltage 26 received from the bias supply 15. The bias supply 15 is internally rectified to provide a DC signal to the temperature-compensated shunt regulator 16 and the output magnetic amplifier 21.

Figure 2:
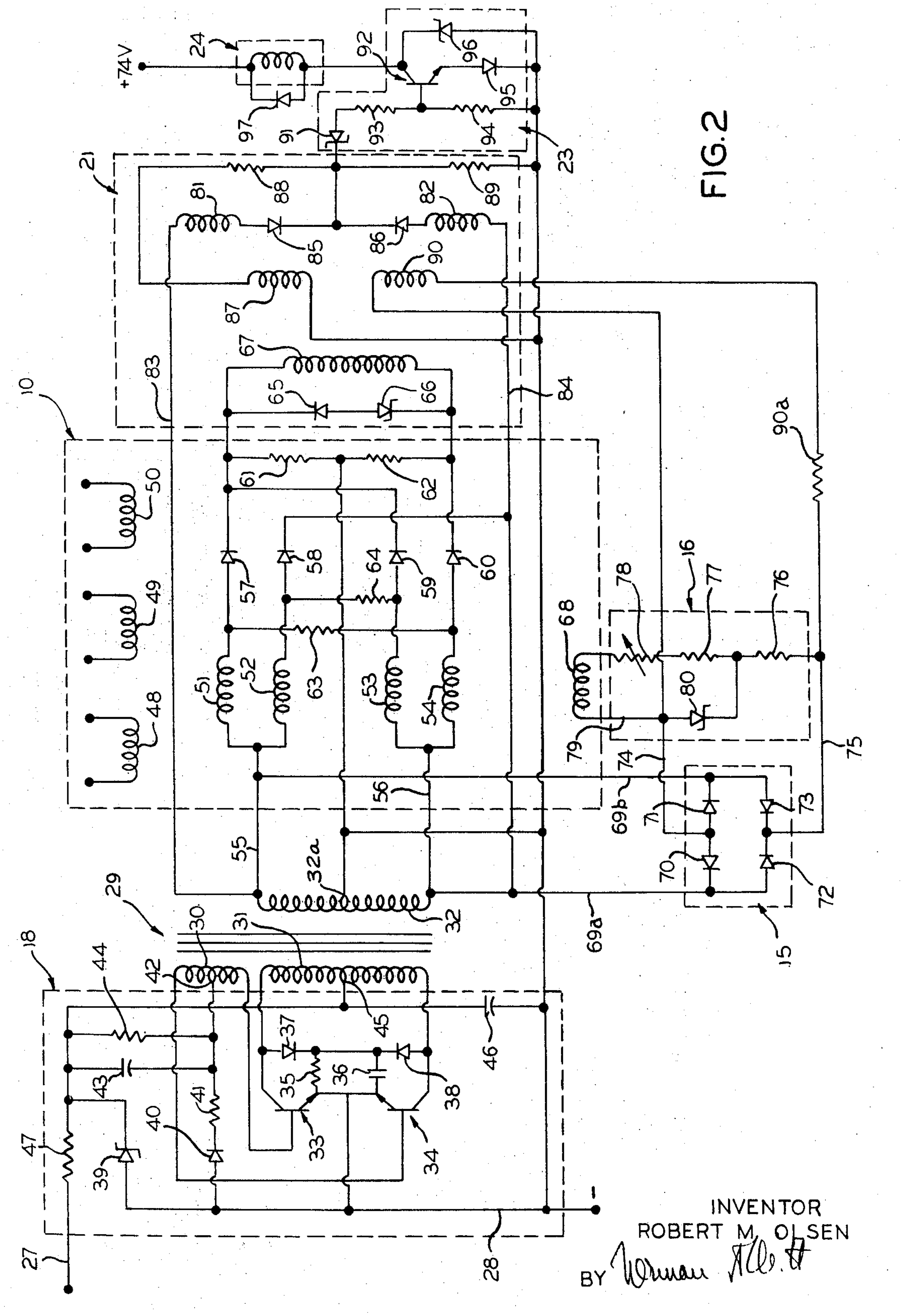
FIG. 2 is an electrical schematic diagram of the relay driver according to the present invention.

Referring now to FIG. 2, the inverter 18 is connected to the train voltage through lines 27 and 28. AC voltage produced by the inverter is received by the preamp 10 through a coupling transformer 29 which includes an input winding 31, an output winding 32, and a feedback winding 30.

Transistors 33 and 34 are provided in the inverter, the bases of which are connected to opposite ends of the feedback winding 30. The collectors of the transistors 33 and 34 are connected to opposite ends of the input winding 31, while the emitters are connected in common and in common with a resistor 35 and a capacitor 36. The resistor and capacitor are connected in parallel and in turn connected to the collectors of the transistors through diodes 37 and 38. The inverter is voltage regulated by a Zener diode 39 connected across the supply voltage lines 27 and 28. A diode 40 is connected in series with the resistor 41 and the resistor is connected to a center tap 42 of the feedback winding 30. A capacitor 43 is connected in parallel with a resistor 44 and in common at one end to the cathode of the Zener diode 39 and at the other end in common with the resistor 41 and center tap 42 of the transformer input winding 30. The emitters of the transistors 33 and 34 are also connected in common with the anode of the Zener diode 39 and the anode of diode 40. The input winding 31 is center tapped at 45 and connected to the negative line 28 through a capacitor 46, and connected to the positive line through a series resistor 47. Accordingly, a regulated alternating current voltage is produced by the inverter 18 for driving the magnetic amplifiers 10 and 21, and the bias supply 15, the latter of which is thereafter fully rectified.

The magnetic amplifier 10 serves as a preamp to receive the input signal and amplify same, and feed a signal exceeding the reference signal to the bistable magnetic amplifier 21. The preamp 10 includes a plurality of signal input windings 48, 49 and 50, and a plurality of load windings 51, 52, 53 and 54. Any one or all of the input windings 48, 49 and 50 may be utilized to provide an arithmetical additive signal to the magnetic amplifier load windings. A supply voltage is delivered to the load windings from the secondary winding 32 of the transformer 29 through lines 55 and 56.

Diodes 57, 58, 59 and 60 constitute part of the magnetic amplifier circuit and are respectively connected in series with load windings 51, 52, 53 and 54. Ballast resistors 61 and 62 are connected together in series, and in parallel with the load windings. The common of resistors 61 and 62 is connected to a center tap **32*a* on secondary winding 32 which is also connected to ground. A core-resetting resistor 63 is connected in common at one side to load winding 51 and diode 57 and at the other side to load winding 54 and diode 60. A core-resetting resistor 64 is connected in common at one side to load winding 52 and diode 58 and at the other side to load winding 53 and diode 59. A diode 65 is connected in series with a Zener diode 66 and across the output of the load windings. The diode 66 and across the output of the load windings. The diode 65 blocks any alternating current in one direction while the Zener diode 66 blocks any alternating current in the other direction until it reaches the Zener voltage. The alternating current at this point is extraneous and generated by the input winding 67 of the magnetic amplifier 21**.

A bias signal is introduced into the magnetic amplifier 10 through the bias winding 68 as generated by the bias supply 15. This is a DC signal as are the input signals on the windings 48, 49 and 50. AC voltage is delivered to the bias supply through lines 69*a* and 69*b* taken from the output winding 32 of the transformer 29, and fully rectified by the diodes 70, 71, 72 and 73. The output of the bias supply is delivered to the bias winding 68 through output lines 74 and 75.

In order to enhance the stability of the magnetic amplifier 10 and the bias signal on winding 68, the bias signal is controlled by a temperature-compensated shunt regulator 16 which includes resistors 76 and 77 connected in series and in series with an adjustable resistor 78 and to one end of the bias winding to connect one side of the bias supply 15 to the winding.

The other side of the winding 68 is connected directly to the other side of the bias supply through a line 79 and line 74. A temperature-compensated Zener diode 80 is connected to one side of the bias supply and in common to the resistors 76 and 77. This shunt regulator provides a stable bias current to the bias winding 68. Adjustment of the reference current in the bias winding may be made by the adjustable resistor or potentiometer 78.

As already mentioned, the magnetic amplifier 21 is conditioned to operate as a bistable circuit for triggering transistor switch 23 when the polarity of the output signal of the preamp 10 changes. Load windings 81 and 82 are included in the magnetic amplifier 21. An AC supply voltage is delivered to the load windings from the output winding 32 of the transformer 29 through lines 83 and 84. Diodes 85 and 86 are provided in the magnetic amplifier circuit between the load windings 81 and 82. A feedback winding 87, providing a positive feedback and sharp turn on-off of said amplifier so that it is either on or off, is connected at one end to negative potential and at the other end to a resistor 88 that is connected in common to the cathodes of diodes 85 and 86 and the output of the amplifier. A magnetic amplifier load resistor 89 is connected at one end in common to the cathode of diodes 85 and 86 and at the other end to negative potential. A bias signal is provided through the bias winding 90 which is connected to the bias supply 15 through a resistor 90*a*.

The output of the magnetic amplifier 21 is delivered to a transistor switch 23 through a Zener diode 91 and to the base of the transistor 92. A current-limiting resistor 93 is provided between the base and Zener diode 91 to drive the base, while a resistor 94 is provided between the base and ground to load the base and assure turnoff of the transistor. The Zener diode 91 provides full voltage snap-on action for the transistor 92 as the magnetic amplifier 21 turns on, and prevents partial turn-on of transistor 92 by holding back the signal of the magnetic amplifier 21 until it reaches a predetermined voltage level. The emitter of the transistor 92 is connected to ground through a diode 95 that provides a small bias voltage for the emitter which aids in turning off the transistor. A Zener diode 96 is connected between the collector of the transistor 92 and ground to protect against line transient voltages.

The relay 24, which is energized and deenergized by the transistor switch 23, is connected in series with the output of the transistor switch and together across the train line voltage. A diode 97 is connected across the relay 24 to protect the transistor 92 against flyback voltage when the relay is deenergized.

Figure 3:
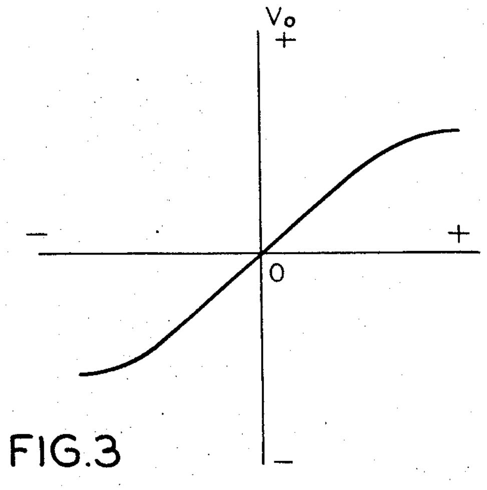
FIG. 3 is a graphical illustration of the signal characteristic of a standard magnetic amplifier such as that employed as a preamp circuit in the present invention.
Figure 4:
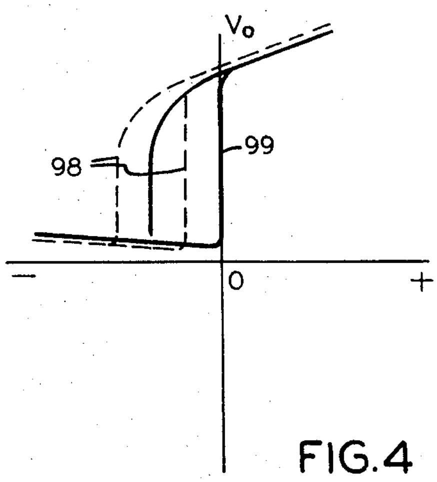
FIG. 4 is a graphical illustration of the signal characteristics for the bistable magnetic amplifier circuit of the present invention and illustrating the signal characteristics of a standard bistable magnetic amplifier circuit.

The general operation of the relay driver may be simply stated as energization or deenergization of the relay 24 depending upon a predetermined signal input to the input windings of 48, 49 and 50 of the preamp 10. More particularly, a DC reference current signal is applied to the bias winding 68. When the arithmetical sum of the signal windings 48, 49 and 50 reaches a level equivalent to the bias signal in the bias winding 68 to cause the output signal of the preamp 10 to pass through the zero point as illustrated in the graph of FIG. 3, the bistable magnetic amplifier 21 is triggered "on". The bias signal from the winding 90 in the magnetic amplifier 21 causes the signal curve of the magnetic amplifier 21 to move from the dotted line position indicated at 98 to the solid line position indicated at 99 (FIG. 4) so that when the magnetic amplifier 21 turns on it will do so as the signal voltage passes substantially through the zero point on the graph. Accordingly, this bias signal enhances the accuracy by causing operation at a point where there is no drift that could result from environmental conditions.

Moreover, because the bias signal to the winding 68 in the preamp 10 is temperature-compensated shunt-regulated, a stable bias current is supplied to the preamp 10 resulting in accuracy in operation.

Putting the operation of the preamp 10 in other words, when the ampere turns of the input of the preamp 10 equal the ampere turns of the bias signal, the magnetic amplifier 21 will be triggered. The ampere turns of the input to the preamp 10 constitute an arithmetical addition of the ampere turns of windings 48, 49 and 50. For example, if the bias signal equaled 100 ampere turns, zero ampere turns in 48 and 49, and 100 ampere turns in winding 50 of opposite polarity would be sufficient to trigger the bistable amplifier 21. Where the bias signal equaled 100 ampere turns, the amplifier 21 would also be triggered when the arithmetic addition of +100 ampere turns in winding 48, −50 ampere turns in winding 49, and +50 ampere turns in winding 50, equals in opposite polarity to the ampere turns of the bias signal.

One example of use for the relay driver circuit of the invention is illustrated in FIG. 5, wherein it is employed in conjunction with circuitry to define a transition relay used on locomotives for handling traction motors during speed changes. Since the circuitry relating to the relay driver and operation thereof are essentially the same as that set forth in FIG. 2, like numerals are applied to like components.

The transition relay receives signals from the locomotive alternator and handles speed changes in accordance with the energization of a relay 100 which operates in a double timing circuit. Relay 100 is energized pursuant to the energization of relay 24 in the relay driver circuit following a predetermined time delay established in the double timing circuit, such as about 4 seconds. Moreover, the double timing circuit delays the deenergization of relay 100 for a predetermined time period following deenergization of relay 24A in the relay driver circuit.

Energization of relay 24A follows the accumulation of an input signal in the first magnetic amplifier in excess of the reference signal established by the bias winding 68A. The input signal is defined by the arithmetic total signal on input signal windings 48A, 49A and 50A. Input winding 48A receives a signal impressed on input line 101 and common line 102, while input winding 49A receives a signal impressed on input line 103 and common line 102. A potentiometer 105 is provided in input line 101, while a potentiometer 106 together with resistors 107*a*, 107*b*, 107*c*, 107*d* and 107*e* are placed in input line 103. The signal for input winding 50A is received on input line 108 and alternately on input line 109 or input line 110 depending on the condition of the timing circuit. Input line 108 is connected to one side of the input winding 50A through a resistor 111 and parallel-connected capacitor 112, and resistor 112*a*, while input line 110 is connected to the other side of the input winding 50A through a Zener diode 113 and a resistor 114. During the energization of relay 100, normally open contacts 115 are closed to connect input line 109 to one side of the input coil 50A through a transistor 116 and the resistor 114 when the transistor is biased "on" by resistor 111.

Energization of relay 24A closes normally open contacts 117 in the double timing circuit to turn "off" a transistor 118 and apply a current to timing capacitor 119. The closing of contacts 117 causes a current to flow through diode 121 and resistor 122, thereby rendering the transistor 118 nonconducting and starting the timing of capacitor 119 by opening the shunt established by the conducting transistor 118. The common of a resistor 123 and diodes 124 and 125 causes the biasing of the transistor 118 to hold it nonconducting until a signal is impressed upon the base upon opening of the contacts 117. The collector of transistor 118 is connected in common to the positive side of timing capacitor 119, the timing resistor 126 and the emitter of a unijunction transistor 127. Base two of the unijunction 127 is connected to positive potential through a resistor 129, while base one is connected to negative potential through a resistor 129. Timing out of capacitor 119 triggers the unijunction 127 to deliver a signal through output line 130 to the gate of a SCR 131, thereby turning the SCR "on", and in turn turning "on" transistors 132 and 133. The anode of SCR 131 is connected to positive potential through a resistor 134. The collector of the transistor 132 is connected to resistor 134 through a resistor 136, and to the base of transistor 133. The relay 100 is energized upon triggering of transistor 133 by connecting the relay across the 74 v. DC input. A diode 137 is connected across the relay 100 to protect the transistor 133 against flyback voltage when the relay is deenergized. A Zener diode 138 is connected between the collector of transistor 133 and negative potential. Thus, closing of normally open contacts 117 of relay 24A causes energization of relay 100 following a time delay.

Upon deenergization of relay 24A in response to the conditioning of input signal windings 48A, 49A and 50A, normally open contacts 117 will again open causing a timing capacitor 139, in conjunction with the timing resistor 140 to start to charge. When this timing circuit times out, the timing capacitor 139 discharges through a junction transistor 141 to trigger the unijunction and apply a signal to the output line 142, through blocking diode 143 to transistor 144. Base one of the unijunction 141 is connected to the negative line 28A through a resistor 145, while base two is connected to the positive line through a resistor 146.

Upon receiving a signal from the unijunction 141, and across the bias resistor 147, the transistor 144 is turned "on", thereby shunting out the SCR 131 and removing the signal to transistor 132 causing the transistor 132 to turn "off". This, in turn, causes transistor 133 to turn "off" and thereby deenergize relay 100. Thus, relay 100 is deenergized after a time delay following deenergization of relay 24A.

An override signal fed to the base of transistor 144 from the emitter of transistor 116, through resistor 148, provides an interlock which precludes the on condition of relay 100 coincident with the on condition of transistor 116.

Another example of use of the relay driver of the invention is for a wheel overspeed and wheel slip recalibrate circuit as shown in FIG. 6. Such a circuit is employed on a locomotive for determining wheel conditions during operation of the locomotive. Essentially, the circuit has two channels, one for the wheel overspeed and the other for the wheel slip recalibrate aspects. A relay driver circuit, essentially the same as that shown in FIG. 2 is employed in each of the channels. Accordingly, like reference numerals will be applied to like components.

A single inverter 18B serves to power the wheel overspeed channel 150 and the wheel slip recalibrate channel 151, and respectively the channels drive relays 24B and 24C.

Input signals to the channels are received on input lines 152, 153 and 154, wherein the magnetic amplifier 10B of the wheel overspeed channel 150 includes input signal windings 155 and 156, while the magnetic amplifier 10C of the wheel slip recalibrate channel 151 includes the signal winding 157.

Outputs for the wheel overspeed channel 150 include lines 158, 159, 160, 161 and 162. Relay contacts 163 and 164 of the relay 24B control the outputs of lines 159, 160 and 162. The contacts are shown where the relay is deenergized.

The wheel slip recalibrate channel 151 includes outputs 165, 166, 167 and 168, and relay contacts 169 and 170 of relay 24C control output lines 166 and 167. Contacts 169 and 170 are shown as the relay is deenergized.

The operation of channels 150 and 151 for energizing and deenergizing relays 24B and 24C is essentially the same as operation of the circuitry shown in FIG. 2 It is well known that magnetic amplifiers have saturable magnetic cores, but such could not be shown clearly in the drawings due to the large number of windings which are strategically located to enhance clarity of illustration.

It will be understood that modifications and variations may be effected without departing from the scope of the novel concepts of the present invention.

I claim:

1. A relay driver for driving a relay in response to a low signal input comprising, means producing a reference signal, a first magnetic amplifier adapted to receive an input signal and to generate an output signal when the input signal reaches a predetermined level and overcomes said reference signal of opposite polarity, a second magnetic amplifier operating as a bistable amplifier receiving the output signal of said first magnetic amplifier and generating an output signal, means conditioning said second magnetic amplifier to turn on as the signal voltage of said first magnetic amplifier passes substantially through the zero point, a transistor switch triggered by the output signal of the second magnetic amplifier, and relay connected in series between the transistor switch and a power source to be energized upon triggering of the transistor switch.

2. A relay driver as defined in claim 1, wherein temperature-compensated shunt-regulated means maintains the reference signal stable.

3. A relay driver as defined in claim 1, wherein means is provided ahead of said transistor switch to hold back the output signal of the second magnetic amplifier until it has reached such a level to produce snap-on action of said transistor switch.

4. A relay driver as defined in claim 1, wherein said first magnetic amplifier includes a plurality of input signal windings the sum of which coact to arithmetically produce the input signal.

5. A relay driver for driving a relay in response to a low signal input comprising, a first magnetic amplifier, a second magnetic amplifier, a bias supply, a transistor switch, and an inverter for driving said magnetic amplifiers and said bias supply, said first magnetic amplifier having a plurality of input signal windings, a plurality of control windings connected to said inverter and a bias winding, said bias winding being connected to said bias supply and producing a reference signal which when overcome by the signal input results in the production of an output signal for said first amplifier, said second magnetic amplifier having an input signal winding connected to said first magnetic amplifier to receive the output signal therefrom, a plurality of load windings connected to said inverter, a feedback winding and a bias winding, said bias winding being connected to said bias supply to condition the second amplifier to turn on at a point of minimum drift when the signal voltage of said first amplifier passes substantially through the zero point, said feedback winding providing a sharp turn on-off signal for the second amplifier, means connecting the output of the second magnetic amplifier to said transistor switch, and means connecting said transistor switch to said relay and a power source to energize the relay upon turn-on of the transistor switch in response to a turn-on signal from the second magnetic amplifier.

6. A relay driver as defined in claim 5, and temperature-compensated shunt-regulated means connected to said bias winding for said first magnetic amplifier to maintain the current in same stable.

7. A relay driver as defined in claim 5, wherein the sum of said input signal windings of said first magnetic amplifier coact to arithmetically produce the input signal therefor.

8. A relay driver as defined in claim 5, and means for holding back the turn-on signal from the second magnetic amplifier until it has reached such a level to produce snap-on action of said transistor switch.

9. A relay driver as defined in claim 5, and means internally rectifying said bias supply.

10. A relay driver as defined in claim 5, and means for adjusting the reference signal in the bias winding of said first magnetic amplifier.